No. 721,007. PATENTED FEB. 17, 1903.
L. BROCKMEYER.
VEHICLE TOP.
APPLICATION FILED SEPT. 23, 1902.
NO MODEL. 2 SHEETS—SHEET 1.
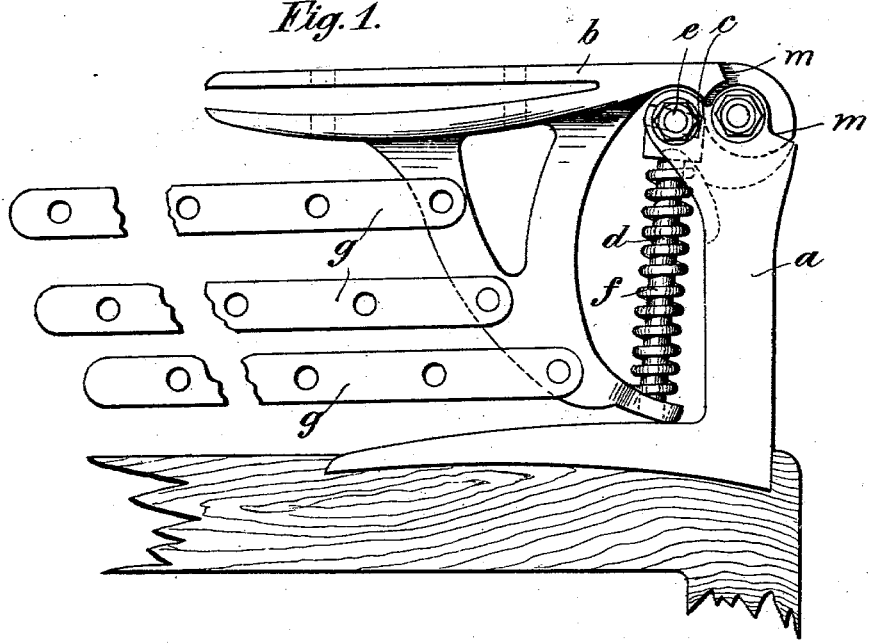
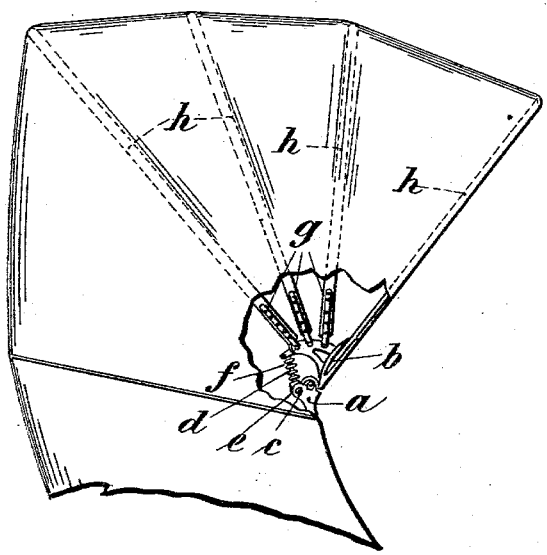
Witnesses:
Inventor:
Ludwig Brockmeyer,
By H. B. Willson & Co
Attorneys.

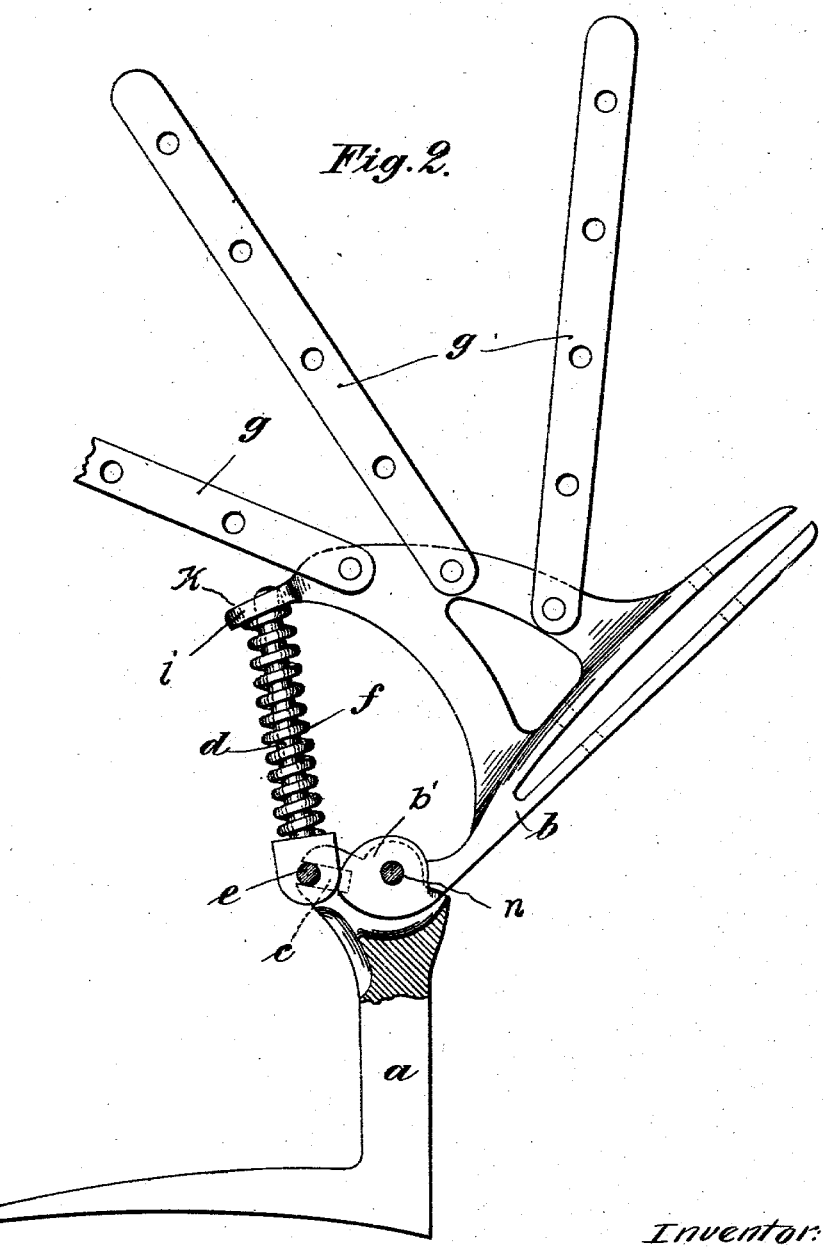

UNITED STATES PATENT OFFICE.

LUDWIG BROCKMEYER, OF OSNABRÜCK, GERMANY.

VEHICLE-TOP.

SPECIFICATION forming part of Letters Patent No. 721,007, dated February 17, 1903.

Application filed September 23, 1902. Serial No. 124,493. (No model.)

*To all whom it may concern:*

Be it known that I, LUDWIG BROCKMEYER, carriage builder, a subject of the King of Prussia, Emperor of Germany, residing at 8ᵇ Haken street, Osnabrück, in the Kingdom of Prussia and Empire of Germany, have invented certain new and useful Improvements in Vehicle-Tops, of which the following is a full, clear, and exact description.

This invention relates to improvements in hoods or covers for carriages and other vehicles, its object being to provide improved mechanism which will not rattle and which is effective to secure the hood when in a raised position, and by means of which the hood may be readily raised or lowered by the occupants of the vehicle when the same is in motion.

My invention consists in the peculiar construction and combination of devices hereinafter described and claimed.

In the accompanying drawings, Figure 1 is a side elevation of my improved carriage-top mechanism, showing the same in the position assumed thereby when the top or hood is lowered. Fig. 2 is a similar view, partly in section, of the same in a raised position. Fig. 3 is a side elevation of the carriage hood or cover, in raised position, provided with my improved mechanism.

In the drawings, $a$ indicates a support, the upper end of which is slotted and which is adapted to be secured on one side of the seat or body of the vehicle, as shown. In the slot or bifurcation at the upper end of the support is seated the lower pivotal end of the carrier $b$, to which the front bow of the hood or cover is attached and which is pivoted to the support $a$ by the bolt $n$. The said carrier $b$ has a rearwardly-extending arm $i$, provided near its extreme rear end with a slot $k$, and said carrier is further provided at its lower pivotal end with an eccentric cam $b'$. The support $a$ and carrier $b$ have coacting stops $m$, which engage each other when the hood is raised. To the rearwardly-extending arm $i$ of the support are pivotally connected the lower ends of a plurality of metallic straps $g$, which serve for the pivotal connection of the hood hoops or ribs to the said carrier $b$.

Between the arm $i$ of the carrier $b$ and the support $a$ there is disposed a stay $d$, which has at its lower end a pivot-pin $e$, which is free to play in a slot $c$ with which the support $a$ is provided, which slot is substantially radial with reference to the pivot $n$. The lower end of the stay $d$ bears against the eccentric cam $b'$, and the upper end of said stay is free to operate in the slot $k$ of the carrier-arm $i$. On the said stay and bearing between the enlarged lower portion thereof and the arm $i$ of the carrier $b$ is a spring $f$, which is here shown as a coiled extensile spring and which bears upwardly under the arm $i$ to maintain the carrier $b$ in the position shown in Figs. 2 and 3 when the stops $m$ are in contact with each other and the cover or hood is raised.

When the cover or hood is lowered, the eccentric cam $b'$ enables the pivot $e$ and the stay $d$ to move forwardly in the slot $c$ and decreases the tension of the spring $f$. When the hood is raised, the lower end of the said stay is moved rearwardly by the said eccentric cam, as will be understood, and the tension of the said spring $f$ increased. The spring by bearing constantly between the enlarged head at the lower portion of the stay and the arm $i$ of the carrier $b$ at all times exerts pressure on the said stay and on the eccentric cam, with which the lower end of the stay is in constant engagement, and prevents rattling of the pivotal connections $e$ and $n$.

From the foregoing description, taken in connection with the accompanying drawings, the construction, operation, and advantages of my invention will be apparent, it is thought, without requiring a more extended explanation.

Various changes in the form, proportion, and the minor details of construction may be resorted to without departing from the principle or sacrificing any of the advantages of the invention.

What I claim, and desire to secure by Letters Patent, is—

In a device of the class described, the combination of a support and a carrier pivoted thereto, the latter having a rearwardly-extending arm $i$ and an eccentric cam $b'$ at its lower portion, and said seat-support having a slot $c$ substantially radial to the pivot, a stay having a pivot movable in said slot, having its lower end in engagement with the said cam and having its upper end extended through a slot in the carrier-arm $i$, and a spring carried by said stay and pressing upwardly on the said carrier-arm, said spring maintaining the pivotal portion of said stay in constant engagement with said eccentric cam, substantially as described.

In witness whereof I subscribe my signature in presence of two witnesses.

LUDWIG BROCKMEYER.

Witnesses:
F. A. BRYCE,
C. DIEDERICH.